United States Patent [19]
Borsh et al.

[11] Patent Number: 5,170,013
[45] Date of Patent: Dec. 8, 1992

[54] MOUNTING FASTENER FOR ELELCTRICAL WIRING BOXES

[75] Inventors: Richard J. Borsh, Chagrin Falls; James A. Rajecki, Parma, both of Ohio

[73] Assignee: The Lamson & Sessions Co., Cleveland, Ohio

[21] Appl. No.: 514,688

[22] Filed: Apr. 26, 1990

Related U.S. Application Data

[63] Continuation-in-part of Ser. No. 326,319, Mar. 21, 1989.

[51] Int. Cl.[5] ............................................. H02G 3/08
[52] U.S. Cl. ........................................ 174/53; 220/3.2
[58] Field of Search ...................... 174/53; 220/3.2, 3.3

[56] References Cited

U.S. PATENT DOCUMENTS 3,526,703  9/1970  Tucker .................................. 174/53
4,315,100  2/1982  Haslbeck et al. ................. 174/53 X
4,529,834  7/1985  Nattel .................................. 174/53

Primary Examiner—Leo P. Picard
Assistant Examiner—D. A. Tone
Attorney, Agent, or Firm—Fay, Sharpe, Beall, Fagan, Minnich & McKee

[57] ABSTRACT

An electrical outlet box is molded of plastic and includes push-in type screw receiving openings each of which is defined by rigid first and second walls having opposed semi-cylindrical faces mounted in spaced and axially aligned relationship to produce a generally cylindrical passage open at an outer end. Threads are formed about the interior of the cylindrical passage. In a first embodiment, the first wall is supported and carried substantially entirely by a resilient support wall lying in a plane generally perpendicular to the axis of the cylindrical passage. The support wall is mounted in cantilever fashion at a location spaced radially from the axis of the cylindrical passage so that the first wall can resiliently deflect away from the second wall when a screw is pushed axially into the passageway. In a second embodiment, both the first and second walls are mounted by resilient support walls to allow deflection in the manner described.

8 Claims, 4 Drawing Sheets

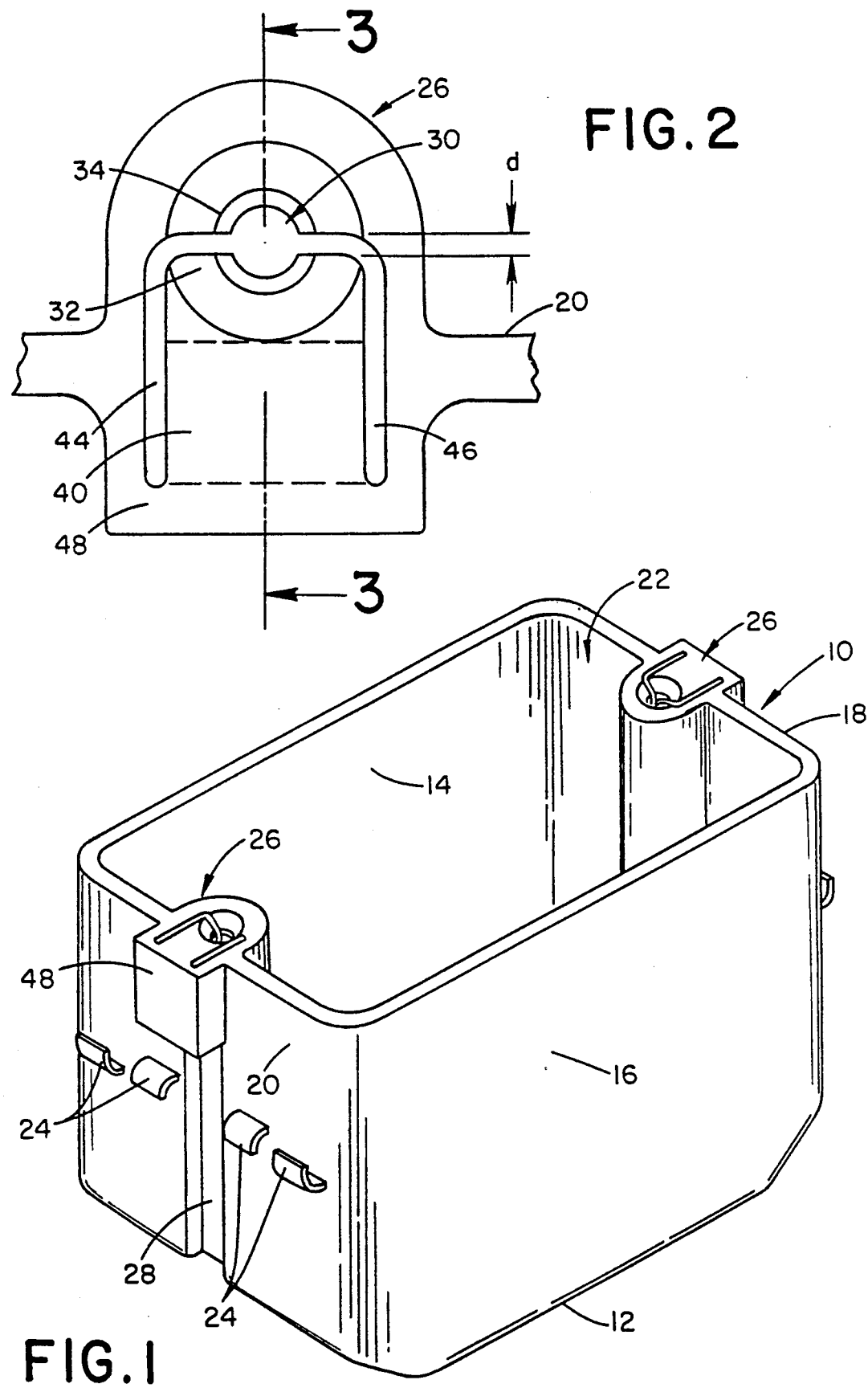

MOUNTING FASTENER FOR ELELCTRICAL WIRING BOXES

BACKGROUND OF THE INVENTION

This application is a continuation-in-part of application Ser. No. 326,319, filed Mar. 21, 1989 for Mounting Fastener for Electrical Wiring Boxes.

The subject invention is directed toward the art of mechanical connectors and more particularly, to a screw thread connection of the "push-in" type.

The invention is especially suited for use in electrical junction and wiring box structures to provide screw mountings for wiring devices and will be described with reference thereto; however, as will become apparent, the invention is capable of broader application and could be used in many different environments.

Electrical wiring boxes commonly include connections for facilitating the mounting of various wiring devices such as switches, electrical outlets and the like. The connections are typically simple threaded openings for receiving mounting screws. In certain designs, however, the openings have included resilient tabs or inserts to allow for "push-in" insertion of the mounting screws. Such arrangements are illustrated, for example, in U.S. Pat. Nos. 4,130,335, 4,069,448, 3,955,463 and 4,188,854.

In each of the known prior art arrangements a separate spring steel insert or multiple independent components are required. As is apparent, these prior designs tend to increase the cost of the units. Further, the use of the separate inserts requires an additional assembly step during the box manufacturing process.

BRIEF STATEMENT OF THE INVENTION

The subject invention overcomes the above noted problems and provides a fastener design which is particularly suited for incorporation in molded plastic junction boxes. The fastener assembly can be molded integrally with the box structure so that a separate insert member or the like is not required. In particular, in accordance with a preferred embodiment of the invention, there is provided an electrical outlet box molded of plastic and having at least one push-in type screw receiving opening formed therein. The screw receiving opening is defined by rigid semi-cylindrical first and second walls having opposed faces mounted in spaced and axially aligned relationship to produce a generally cylindrical passage open at an outer end. Threads or thread forming sections are carried on the opposed faces inward from the outer end to provide helical screw receiving threads about the interior of the cylindrical passage. At least the first of the semi-cylindrical walls is supported and carried substantially entirely by a resilient support wall lying in a plane generally perpendicular to the axis of the cylindrical passage. The support wall has opposed ends with one end joining the first semi-cylindrical wall adjacent the outer end of the cylindrical passage. The other end of the support wall is mounted and supported in cantilever fashion at a location spaced radially from the axis of the cylindrical passage on the side opposite the first wall.

The arrangement of the first semi-cylindrical wall and its support wall is such that when a threaded screw member is moved axially into the screw receiving opening the first semi-cylindrical wall section is caused to pivot away from the second cylindrical wall. The pivoting is sufficient to allow the threaded screw to enter the passageway. After entry of the screw into the passageway, the first cylindrical wall section can move back to its original parallel relationship with the second cylindrical wall. Thus the first wall moves into engagement with the screw member. The screw member cannot be simply axially withdrawn because of the relationship between the cylindrical walls and the support wall. That is, a camming closure of the two support walls causes the screw to be tightly gripped in threaded relationship with the opening. The screw member can, however, be axially withdrawn by a normal unthreading type operation.

All of the elements which form the fastener opening are formed integrally with the body of the molded plastic outlet box. Thus manufacture and assembly of separate elements is not required and a highly efficient push-in type fastener design results.

In accordance with another aspect of the invention, each of the first and second cylindrical wall sections is carried by a separate support wall integral with the cylindrical support wall it carries with the remainder of the outlet box. In addition, each support wall normally maintains its respective semi-cylindrical wall biased to a normal position parallel with the other semi-cylindrical wall. The required resiliency in the support walls is preferably provided by proper selection and shaping of the plastic material from which the box and its integral fastener assemblies are molded.

In accordance with a further aspect of the invention, the separate support walls which carry the first and second semi-cylindrical walls are mounted for pivotal bending movement about axes parallel to each other.

As can be seen from the foregoing, a primary object of the subject invention is the provision of a push-in type fastener assembly for use in electrical outlet boxes which assembly eliminates the need for separate fastener insert members and the like.

A still further object of the invention is the provision of fastener assembly of the general type described wherein all elements of the fastener receiving opening are molded integrally with the outlet box.

Another object of the invention is the provision of a push-in fastener assembly which is a simple, one piece molding.

BRIEF DESCRIPTION OF THE DRAWINGS

The above and other objects and advantages will become apparent from the following description when read in conjunction with the accompanying drawings wherein:

FIG. 1 is a pictorial view of an electrical outlet box formed in accordance with a preferred embodiment of the subject invention;

FIG. 2 is a greatly enlarged plan view of one of the screw receiving fastener openings of the outlet box of FIG. 1;

DETAILED DESCRIPTION OF THE PREFERRED AND ALTERNATE EMBODIMENTS

Figure 3:
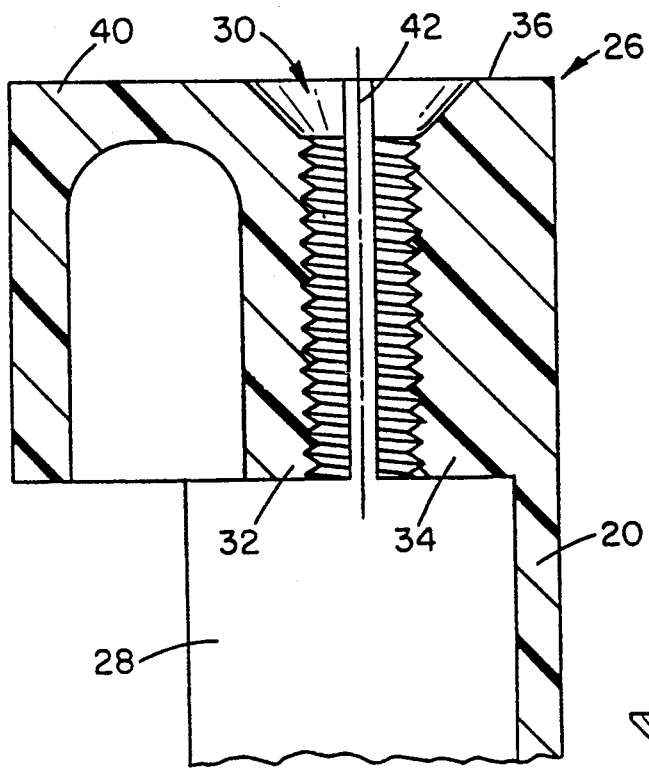
FIG. 3 is a partial cross-sectional view taken on line 3—3 of FIG. 2.

Referring more particularly to the drawings wherein the showings are for the purpose of illustrating a preferred embodiment of the invention only, and not for the purpose of limiting same, FIG. 1 shows the general overall arrangement of an electrical outlet box assembly 10. The outlet box assembly 10 is of a typical overall size and configuration as is used, for example, for conveniently mounting and supporting electrical wiring devices such as switches, receptacles, lighting fixtures and the like. Typically, the boxes of the type under consideration are mounted in wall or ceiling openings and the electrical device and/or cover plates used with the boxes are mounted to the box through the use of small diameter screws.

In the subject embodiment the box 10 is illustrated as being a molded as a one piece structure formed from a suitable resinous plastic. Many different thermoplastics are suitable for use in this type of structure and environment. Typical of those which could be used are polyvinylchloride, polyphenylene oxide and polycarbonate resins. Obviously, many different types of resinous plastic materials could be used and are known to have the characteristics desired.

As shown in FIG. 1, box assembly 10 includes a lower wall or base 12 with opposed upstanding side walls 14 and 16. Integral with the base and the side walls 14, 16 are a pair of opposed end walls 18 and 20. The box assembly 10 thus provides a chamber 22 which can house various wiring connections and/or associated wiring devices of the type mentioned earlier.

As is typical with electrical boxes of the type under consideration, means are provided to permit the box to be suitably mounted to wall studs or associated support structure. As shown in FIG. 1, the subject box is illustrated as including integrally molded nail brackets or holding elements 24. Elements 24 are conventional and provide means for connecting suitable mounting nails or the like to the box assembly 10.

As is customary, the box is illustrated as having screw receiving opening assemblies 26 formed in each of the end walls generally centrally thereof. The exact locations of the screw receiving openings, as well as the total number of such openings provided, can vary widely from that shown depending upon the size of the box and the particular wiring devices which are to be mounted. The illustrated box is typical of those used for the standard switch and electrical outlet assemblies. As previously mentioned, and as shown in the noted prior art patents, many different types of screw receiving openings and screw fastening assemblies have been proposed for use in such electrical outlet boxes. The more desirable types are those which permit the screws to be mounted in the openings by a simple push-in operation. As discussed, the prior push-in type screw receiving openings have required the use of separate spring steel inserts which must be installed in a separate assembly operation during the manufacture of the boxes. The subject invention provides a highly simplified and efficient structure which can be molded directly in the box during the molding operation.

Figure 4:
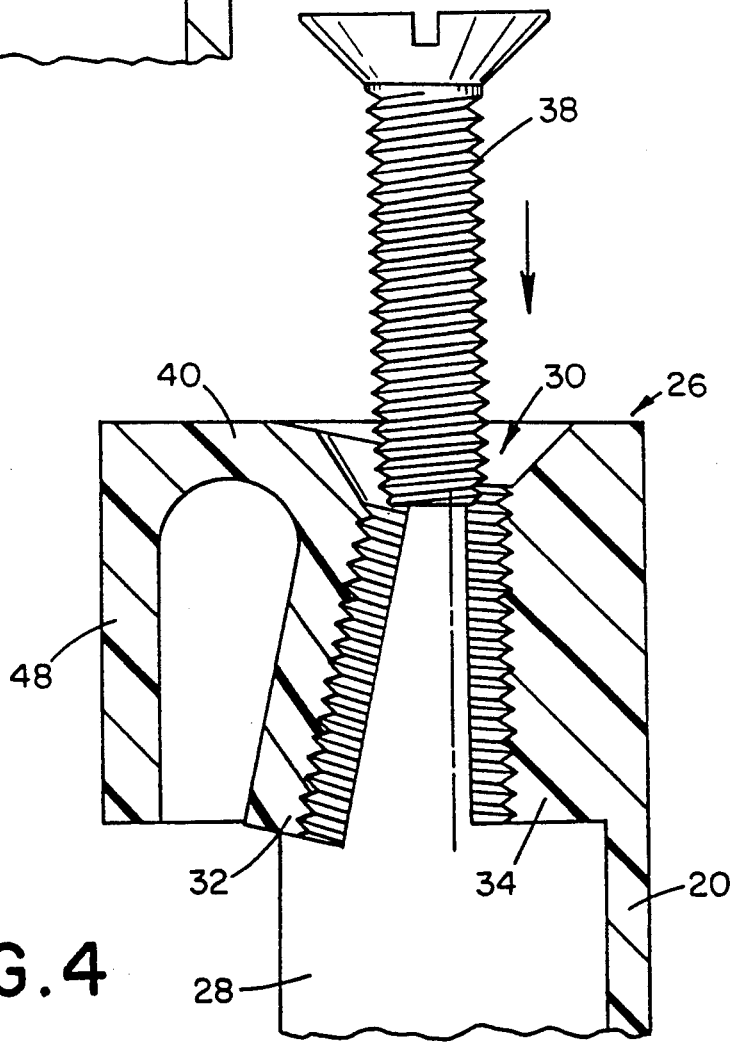
FIG. 4 is a cross-sectional view similar to FIG. 3 but showing the tilting movement of the fastener receiving opening which takes place during installation of a mounting screw.

As best shown in FIGS. 2 through 4, the screw receiving assemblies 26 are molded integrally with the end walls 18, 20 of the box assembly 10. Each of the screw receiving openings in the subject preferred embodiment are of identical structure and configuration. Accordingly, only one will be described in detail and the description thereof is to be taken as equally applicable to the other. In particular, the screw receiving assembly 26 carried on wall 20 is located at the upper end of a concave wall section 28 which runs the vertical length of the end wall 20. Vertically aligned with the groove or recess 28 is the screw receiving opening 30. The opening 30 comprises a vertical passageway defined by rigid first and second walls 32 and 34 respectfully. The walls 32 and 34 have semi-cylindrical interior faces. They are positioned with their semi-cylindrical interior faces mounted and spaced in axially aligned relationship to produce a generally cylindrical screw receiving passage open at the upper end as illustrated. The interior faces of the walls 32 and 34 are each provided with thread forms which cooperate to define a helical screw thread about the interior of the cylindrical passageway. The thread forms are made by a standard tapping operation; however, it should be understood that the threads could be molded and/or be given different configurations.

As best illustrated in FIG. 2, the walls 34 and 32 are spaced apart a distance "d". It is important to note, however, that each of these walls is molded as an integral part of the main structure of the box assembly 10.

The upper or outer end face 36 is coplanar with the upper edge of the box assembly 10. In addition, the outer end of the threaded screw receiving passageway 30 is preferably chamfered or provided with a frustoconical configuration as best illustrated in FIG. 3. This facilitates guiding of the associated mounting screw into the passageway.

According to the subject invention, at least the first semi-cylindrical wall 32 is mounted in a manner which permits it to, in effect, tilt away from the opposed wall 34 when an inwardly directed axial force is applied to the wall. This, as can be appreciated, allows the wall to move to the position illustrated in FIG. 4 so that the associated screw 38 can be pushed axially into position in the passageway 30. It should, of course, be understood that after the screw 38 has been moved to its located position in the opening, the wall will reassume its normal relationship with wall 34 to firmly grip the screw 38. Similarly, because of the relationship and the method by which the wall is mounted, a simple axial force cannot be used to remove the screw 38. That is, an axial withdrawal force applied to the screw merely causes the wall 32 to more tightly grip the screw by moving in a direction generally toward the opposed wall 34.

As particularly shown in FIG. 3, the wall 32 is supported adjacent the outer open end of the passage 30 by a horizontally extending support wall section 40. Wall section 40 is designed so as to be resilient and to maintain the wall 32 under a continual bias toward the normal position FIG. 3. In the embodiment under consideration, wall 40 is coextensive with the upper surface 36 and lies in a plane which is perpendicular to the central axis 42 of the passage 30. As best illustrated in FIG. 2, the wall 40 is separated from the remainder of the top surface of the box assembly by a vertically continuous slot 44 on one side and a similar slot 46 on the other side. In this embodiment, slots 44, 46 extend parallel and the wall 40 is provided with a fillet at its junction with wall 32.

The support wall 40 is mounted and supported in cantilever fashion at a location spaced outwardly from the axis 42 and joined along a line generally in the plane of the top surface 36 and in a plane parallel to the axis 42 but lying on the side opposite the wall 34. As illustrated, the wall 40 is supported from a generally rectangular protuberance 48 (see FIG. 1) which extends outwardly from the end wall 20. This protuberance and the support wall 20 are integrally molded with the remainder of the electrical outlet box assembly 10.

Referring more particularly to FIG. 4, the movement of the first wall 32 during insertion of the threaded screw is clearly illustrated. In particular, as the screw 38 is moved axially into the passageway 30 it will normally engage with the outer end of the opening and be prevented from moving axially inward because of engagement between the external threads on the screw and the internal threads in the opening 30. As the screw is pushed axially inward, however, the forces act to cause the wall section 32 to be tilted in the manner shown because of the inherent and biasing flexibility built into the support wall 40. The support wall does, as a consequence, maintain a continual bias on the wall 32 attempting to return it to its normal FIG. 3 position. As the screw 38 moves inwardly to its final located position, its screw threads are received in the internal screw threads of the opening 30 and when inward movement is complete, the wall 32 returns to its position firmly in engagement with the exterior of the screw 38.

It should be appreciated that the screw 38 can be removed by a simple unthreading operation and multiple connections and disconnections are possible.

Figure 5:
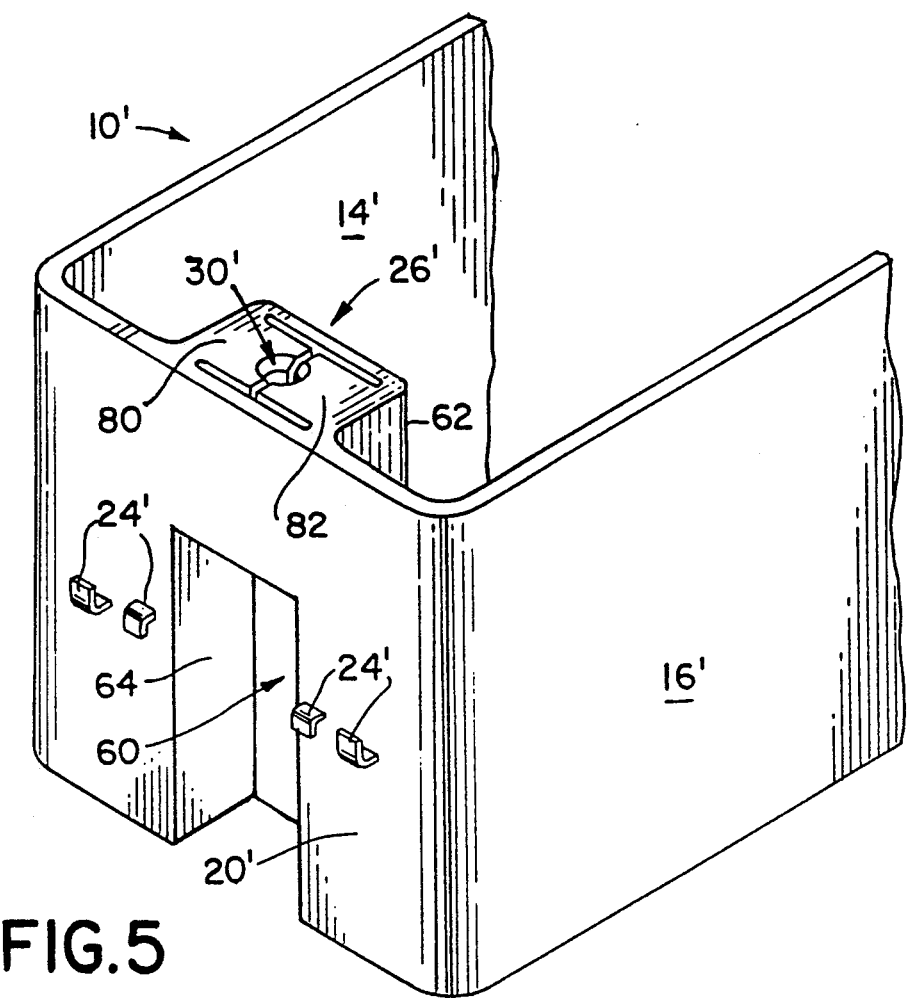
FIG. 5 is a partial pictorial view similar to FIG. 1 but showing an outlet box with a modified form of fastener assembly formed in accordance with the invention.
Figure 6:
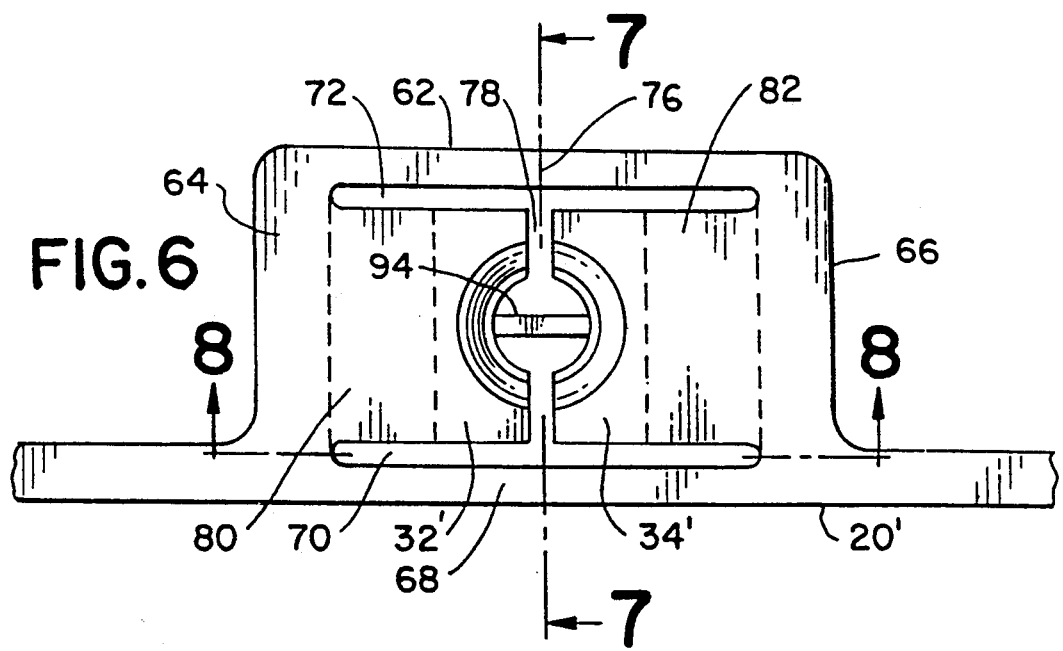
FIG. 6 is a greatly enlarged plan view of one of the screw receiving fastener openings of the outlet box of FIG. 5.
Figure 7:
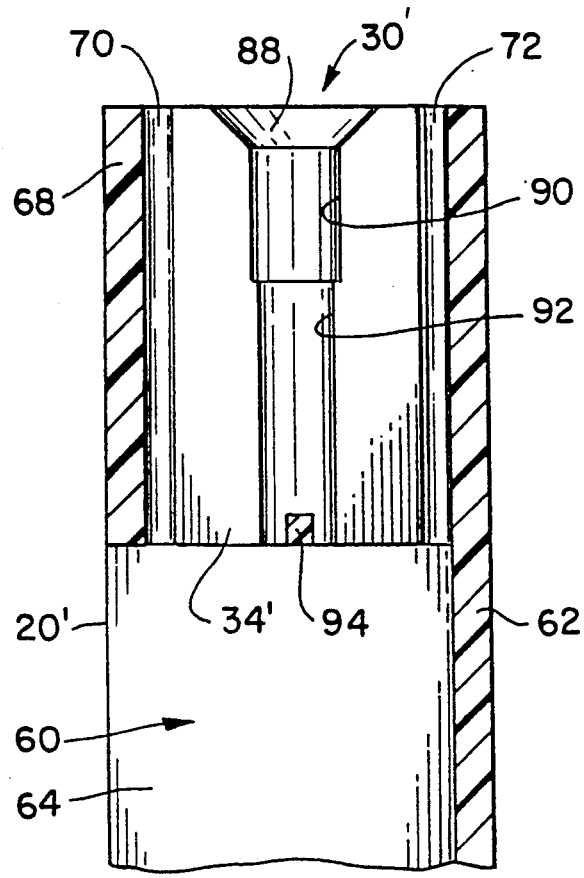
FIG. 7 is a cross-sectional view taken on line 7—7 of FIG. 6.

FIGS. 5 through 7 show a second embodiment of the invention wherein the screw receiving assembly is arranged so that it lies entirely within the interior of the box to thereby eliminate the need of an outwardly extending protrusion or enlargement as is required by the FIGS. 1 through 4 embodiment. In the FIGS. 5 through 7 embodiment, like reference numerals differentiated by a prime suffix have been used to identify components which correspond to those of the FIGS. 1 through 4 embodiment. The description of one such component is to be taken as equally applicable to the other unless otherwise noted.

In the FIGS. 5 through 7 embodiment the screw receiving assembly 26' is located totally within the confines of the electrical outlet box. By this is meant that the screw receiving assembly 26 including all of the supporting walls and structure lie entirely within the space enclosed by the walls 14', 16' and the end walls 18' and 20'. In particular, the end wall 20' includes a recessed or groove section 60 which extends inward to a vertically extending flat inner wall 62 (see FIG. 7). The wall 62 extends from the bottom to the open upper end of the electrical outlet box 10'. Side walls 64 and 66 extend inwardly to define the lateral side edges of the groove 60 as best seen in FIG. 6. A relatively short upper wall section 68 connects between the side wall 68, 66 at the upper end of the groove or recess channel 60.

The screw receiving opening 30' is, like the FIGS. 1 through 4 embodiment, defined by an opposed pair of walls 32' and 34'. The walls 32' and 34' have semi-cylindrical opposed faces which form the cylindrical opening 30'. The walls are separated from the respective side walls 62 and 68 by parallel extending slots 70 and 72.

Additionally, as shown in FIGS. 5 and 6, the two walls 32' and 34' are positioned in opposed relationship on opposite sides of a mid-plane 76 and spaced from one another by a groove 78 as illustrated.

Figure 8:
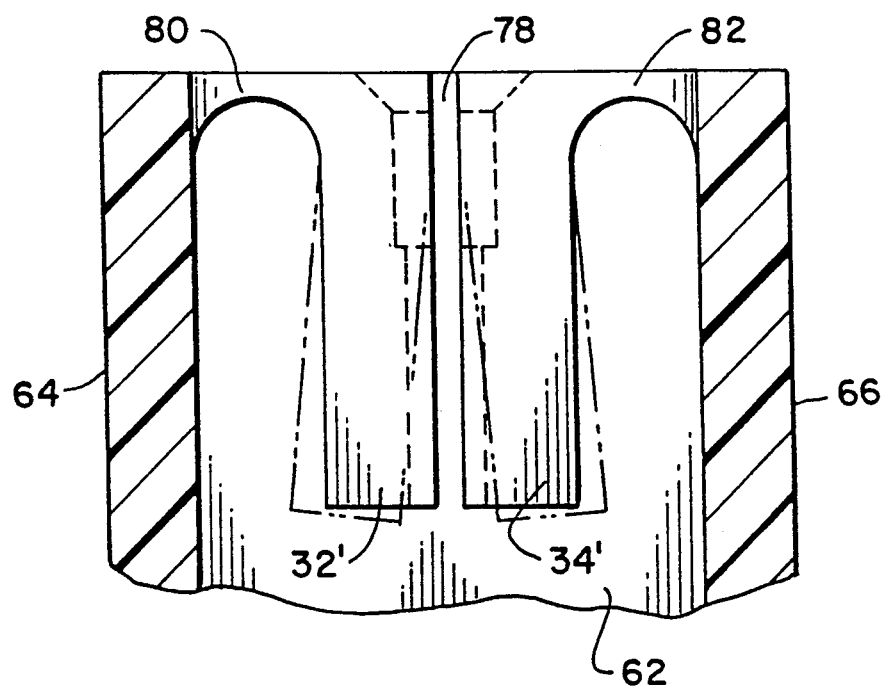
FIG. 8 is a cross-sectional view taken on line 8—8 of FIG. 6.

Each of the walls 32' and 34' are separately supported in cantilever fashion by an upper support wall 80, 82 respectively. The wall 80, 82 is, as best shown in FIG. 8, relatively thin and capable of allowing the associated wall section 32', 34', to pivot or bend in the manner shown in FIG. 8.

FIGS. 5 through 7 illustrate the box and the screw receiving assembly in the as molded condition. That is, as shown in FIG. 7, the opening 30' is molded with three sections including a first section 88 which is tapered and provides a lead-in to a first cylindrical section 90 and a second somewhat smaller diameter section 92. Section 90 is preferably of a diameter to correspond to the crest diameter of the screw to be received in the opening 30'. Cylindrical section 92 is, on the other hand, somewhat smaller and preferably has a maximum diameter which is only slightly greater than the root diameter of the screw. After molding, the section 92 of the opening 30' is preferably tapped to provide suitable threads for receiving the associated screw. To assist in the tapping operation and to help maintain the walls properly spaced and oriented during the movement of the tap into the opening 30', a frangible section 94 is moled to connect at the lower ends between the walls 34' and 32'. This acts to assist in maintaining the walls properly spaced during movement of the tap into the opening from the upper end. As the tap completes the threading operation, it does, however, remove section 94.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalent thereof.

What is claimed is:

1. An electrical outlet box molded of plastic and having at least one push-in type screw receiving opening formed therein, said screw receiving opening defined by rigid first and second walls having opposed semi-cylindrical faces mounted in spaced and axially aligned relationship to produce a generally cylindrical passage open at an outer end, threads are formed on the opposed faces inward from said outer end to provide helical screw receiving threads about the interior of said cylindrical passage; each of said semi-cylindrical walls being supported and carried substantially entirely by separate respective first and second resilient support wall lying in a plane extending generally transverse to the axis of said cylindrical passage, said first support wall supporting said first semi-cylindrical wall and said second support wall supporting said second semi-cylindrical wall, each support wall having spaced opposed ends with one end joining said associated semi-cylindrical wall adjacent said outer end of said cylindrical passage and the other end connected in cantilever fashion at a location spaced radially from the axis of said cylindrical passage, and said first and second support walls being located on diametrically opposite sides of said screw receiving opening.

2. The outlet box as defined in claim 1 wherein said first and second semi-cylindrical walls are molded integrally with said outlet box.

3. The outlet box as defined in claim 1 wherein said first and second resilient support wall normally maintains said first and second semi-cylindrical walls in alignment but permit tilting of said semi-cylindrical walls about separate parallel axes located on opposite sides of said screw receiving opening.

4. The outlet box as defined in claim 3 wherein each said support wall is integral with the respective semi-cylindrical wall which it supports.

5. An electrical outlet box molded of plastic and including at least one screw receiving opening having a cylindrical shape extending axially inward from an open outer end and being defined by a pair of separate generally semi-cylindrical first and second walls molded integrally with said box and positioned in opposed relationship to extend axially of said screw receiving opening; both said first and second walls having opposed semi-cylindrical faces with threads formed thereon to cooperatively define a helical screw thread; each said first and second walls being carried by a separate resilient support means formed integrally with said semi-cylindrical walls for permitting said semi-cylindrical walls to swing away from one another when an axially inwardly directed force is applied to said first wall adjacent the outer end of said opening.

6. The outlet box as defined in claim 5 wherein each said support means comprises a separate relatively thin and flexible support wall molded integrally with said box and supported in cantilever fashion and lying in a plane perpendicular to the axis of said opening adjacent the outer end thereof, said support wall having an end joined to a respective one of each semi-cylindrical walls adjacent said open outer end of said opening.

7. The outlet box as defined in claim 6 wherein said first semi-cylindrical wall and said second semi-cylindrical wall are spaced from each other on opposite sides of a mid-plane which includes the axis of said opening.

8. The outlet box as defined in claim 7 wherein said box includes a bottom wall and four side walls extending generally perpendicular to said bottom wall to define a rectangular chamber, said mid-plane extending perpendicular to said bottom walls.

* * * * *